United States Patent [19]

Nakano et al.

[11] Patent Number: 5,330,573
[45] Date of Patent: Jul. 19, 1994

[54] MOLDING OF CALCIUM SILICATE HAVING HIGH STRENGTH AND ITS MANUFACTURING METHOD

[75] Inventors: Masayuki Nakano; Ryozo Kuramoto; Shigeo Otozaki; Katsuaki Kaneko; Hideo Shibasaki; Noritoshi Tamura, all of Tokyo, Japan

[73] Assignee: Onoda Cement Co., Ltd., Onoda, Japan

[21] Appl. No.: 39,213

[22] PCT Filed: Aug. 9, 1991

[86] PCT No.: PCT/JP91/01069
§ 371 Date: Apr. 5, 1993
§ 102(e) Date: Apr. 5, 1993

[87] PCT Pub. No.: WO93/02986
PCT Pub. Date: Feb. 18, 1993

[51] Int. Cl.$^5$ .......................... C04B 2/00; C04B 14/42
[52] U.S. Cl. ........................................ 106/796; 106/797
[58] Field of Search .............................. 106/796, 797

[56] References Cited

U.S. PATENT DOCUMENTS

| 3,679,446 | 7/1972 | Kubo | 106/796 |
| 3,816,149 | 6/1974 | Zettel | 106/797 X |
| 3,895,096 | 7/1975 | Helser et al. | 501/80 X |
| 3,902,913 | 9/1975 | Helser et al. | 106/711 |
| 4,298,561 | 11/1981 | Uchida et al. | 106/797 X |
| 5,240,501 | 8/1993 | Popovic | 106/792 |

FOREIGN PATENT DOCUMENTS

| 0127960 | 12/1984 | European Pat. Off. | 106/797 |
| 54-125223 | 9/1979 | Japan. | |
| 57-56360 | 4/1982 | Japan. | |
| 58-130149 | 8/1983 | Japan. | |
| 63-43335 | 8/1988 | Japan. | |

Primary Examiner—Helene Klemanski
Assistant Examiner—David Sample
Attorney, Agent, or Firm—Frishauf, Holtz, Goodman & Woodward

[57] ABSTRACT

A molding of calcium silicate having high strength, which is similar to a natural timber, wherein tobermorite, C—S—H (Calcium Silicate hydrate) and quartz are mixed, and glass fiber and pulp are added, respectively, and a Ti/Qi peak ratio of which is powder X-ray diffracted is 0.1 to 1.0, and an absolute bulk density of the molding is 0.3 to 0.7 g/cc.

2 Claims, 5 Drawing Sheets

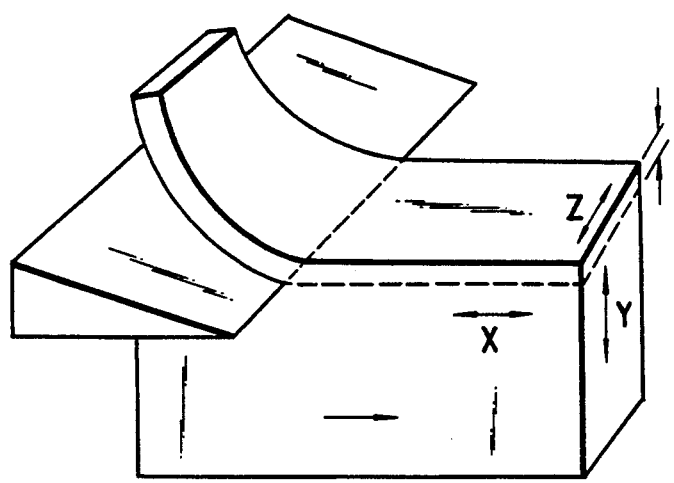
F I G. 2

F I G. 5A
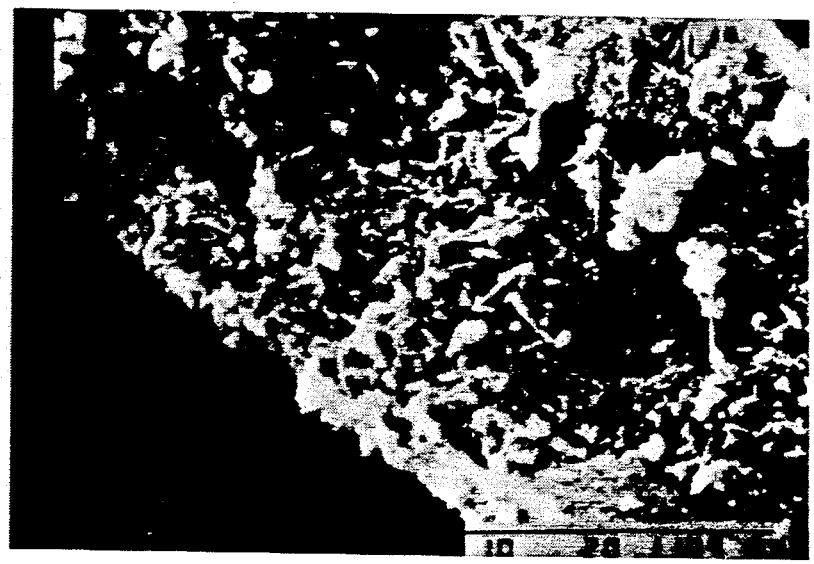
F I G. 5B

MOLDING OF CALCIUM SILICATE HAVING HIGH STRENGTH AND ITS MANUFACTURING METHOD

DESCRIPTION

1. Technical Field

The present invention relates to a molding of calcium silicate having high strength useful for building materials.

2. Background Art

A molding of calcium silicate, which is obtained by hydrothermally synthesizing calcareous material and silicic material, has been widely used as building material having light weight, high strength, high heat resistance, incombustibility property. In recent years, such a molding of calcium silicate has been further improved, and there have been made various proposals to provide the molding of calcium silicate with working properties such as bulk specific gravity, strength, abating, cutting, polishing, screw-nail holding property, and an adhesive property.

However, in the actual state, it is not easy to obtain such a molding having the above-mentioned properties, and the manufacture of the building material, which is similar to the natural timber, has not been realized yet. Conventionally, a matrix of xonotlite, which is reinforced with glass fiber, is typically used as the above-mentioned type material. However, in such a material, since an adhesive strength between glass fiber and xonotlite is low, 5 to 10% by weight of synthetic resin is normally added thereto so as to enhance the adhesive strength. In fact, high adhesive strength to the glass fiber was obtained and its bending strength was satisfied. However, such a material was easily burned since a small amount of synthetic resin existed in the material. Also, heat resistance and incombustibility of such a material were low, and its workability was extremely low as compared with the timber.

DISCLOSURE OF THE INVENTION

According to the present invention, an object is to provide a molding of calcium silicate having high strength wherein glass fiber and pulp are dispersed and strongly adhered without including compounding synthetic resin in the composition, thereby obtaining an incombustible building material, which is similar to a natural timber.

More specifically, the present invention provides a molding of calcium silicate having high strength wherein tobermorite C—S—H (calcium silicate hydrate) and quartz are mixed, and 2 to 10% by weight of glass fiber and pulp are respectively contained as a reinforcing material, a Ti/Qi ratio is 0.1 to 1.0 and an absolute bulk density is 0.3 to 0.7 g/cc when said molding is powder X-ray diffracted wherein Ti and Qi show intensity of the X-ray diffraction of a tobermorite crystal (002) face and that of silica crystal (101) face, respectively. Moreover, there is provided a method for manufacturing a molding of calcium silicate having high strength which is formed of calcareous material, silicic material, and fiber as raw materials wherein the calcareous material and silicic material are added such that the $CaO/SiO_2$ molar ratio is 0.6 to 0.9; silicic material is formed of crystalline silica and amorphous silica, the weight ratio of amorphous silica/(crystalline silica + amorphous silica), is 0.2 to 0.8 and fiber is formed of alkali proof glass fiber and pulp in an amount of 2 to 10% by weight. The method comprises the steps of mixing calcareous material with at least a part of the amorphous silica so as to obtain a slurry at 50° C. or less; heating said slurry to 80° C. or more to be gelled; uniformly mixing said obtained gelled material with resident material including alkali proof glass fiber; dehydrating the obtained mixture under pressure of 3 to 30 $kgf/cm^2$ whereby a molding is obtained; heating and reacting said obtained molding in an autoclave; and setting a Ti/Qi ratio to 0.1 to 1.0 when said obtained molding is powder X-ray diffracted wherein Ti and Qi show intensity of the x-ray diffraction of a tobermorite crystal (002) face and that of silica crystal (101) face, respectively.

BRIEF DESCRIPTION OF THE DRAWINGS

FIG. 2 is a view explaining a method for testing an abating property of the molding of calcium silicate according to the present invention;

FIGS. 5(A), 5(B) and FIGS. 6(A) and 6(B) are SEM photographs showing a broken surface of glass fiber and that of pulp when the molding of calcium silicate of Example 5 is bent and broken.

BEST MODE OF CARRYING OUT THE INVENTION

Figure 1:
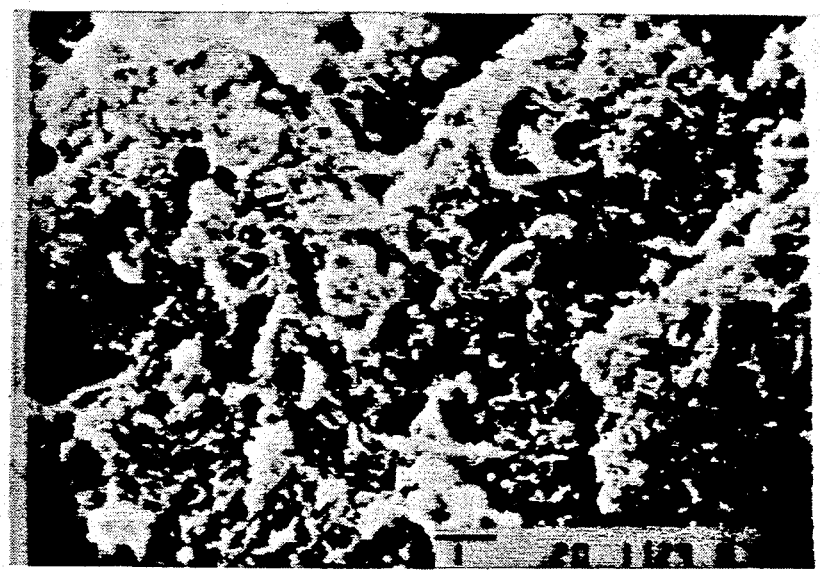
FIG. 1 is an SEM (scanning electronic microscope) photograph showing a crystal structure of a molding of calcium silicate of Example 1 of the present invention.

According to a first invention, there is provided a molding of calcium silicate, glass fiber and pulp are dispersed and adhered to calcium silicate in which tobermorite, C—S—H and quartz are mixed. Each content of glass fiber and pulp mixed therein ranges from 2 to 10%. If the content is below 2%, sufficient strength of the material cannot be obtained. Also, even if the content exceeds 10%, the strength of the material is not desirably improved.

Moreover, when powder X-ray diffraction of calcium silicate constituting the mode is performed, a Ti/Qi ratio is 0.1 to 1.0, and an absolute bulk density is 0.3 to 0.7 g/cc wherein Ti and Qi show intensity of the X-ray diffraction of a tobermorite crystal (002) face and that of silica crystal (101) face, respectively. Therefore, it is required that strength of matrix of calcium silicate itself be high.

For obtaining material, which is similar to a natural timber, by adding reinforcing material to calcium silicate, glass fiber is favorably used as reinforcing material. However, in order to enhance strength of the calcium silicate base material by use of glass fiber, the following points are required. That is, strength of the matrix of calcium silicate itself must be high; adhesion strength of the matrix of calcium silicate to glass fiber must be high; and strength of calcium silicate is not reduced by erosion of glass fiber serving as reinforcing material.

Inventors of the present invention made various experiments and confirmed the following facts.

That is, in a case that the matrix of calcium silicate was formed of C—S—H (Calcium Silicate hydrate) and quartz, the strength of the matrix was low, and the adhesion strength of the matrix of calcium silicate to glass fiber was insufficient. As a result, glass fiber was drawn from the matrix in the case of bending breakage, and a desirable strength was not able to be obtained. Moreover, in a case that most of the matrix was formed of tobermorite crystal, the strength of glass fiber was lowered, and the matrix and glass fiber were simultaneously broken in the case of bending breakage, or glass fiber was broken before the breakage of the matrix. Therefore, reinforcing effect of glass fiber was not shown. In contrast, in a case that tobermorite, C—S—H, and quartz were mixed into the matrix, and glass fiber was adhered to such the matrix, the strength of the matrix was high, and both adhesion strength of the matrix of calcium silicate to glass fiber and the strength of glass fiber itself were high. Particularly, regarding the strength of the matrix, the Ti/Qi ratio (Ti and Qi are the same as the above) was 0.1 to 1.0, and the high strength was shown. Then, when the Ti/Qi ratio was out of the range of 0.1 to 1.0, the strength of the glass fiber was lowered.

Moreover, in order to improve working properties of the material such as the cutting of the molding, abating, polishing, screw-nail holding property, 2 to 10% by weight of pulp must be adhered to the matrix. If the value is below 2%, no effect is brought about, and if the value is over 10%, incombustibility is considerably lowered.

In addition, if the absolute bulk density is below 0.3, a necessary screw-nail holding property cannot be expected. Moreover, if the absolute bulk density is over 0.7, it is difficult to perform nailing or cutting, abating, and the like. Therefore, the absolute bulk density is set to 0.3 to 0.7 g/cc.

According to a second invention, there is provided a method for manufacturing the molding of calcium silicate of the first invention.

First, regarding calcareous material, hydrated lime, quicklime or milk of lime may be used. Regarding silicic material, crystalline silica and amorphous silica and its weight ratio of amorphous silica/(crystalline silica+amorphous silica) ranges from 0.2 to 0.8. If the value is out of the range, the molding of calcium silicate having high strength of the present invention cannot be obtained. Regarding crystalline silica, normal silica powder can be used. Regarding amorphous silica, diatomaceous earth, zeolite, silica flour can be used, but diatomaceous earth is preferably used, and its grain size may be 50 $\mu$m or less. The compounding ratio of calcareous material to silicic material is set from 0.6 to 0.9 at a $CaO/SiO_2$ molar ratio. If the value is out of this range, the product based on the object of the invention cannot be obtained. Moreover, if the value is below 0.6, generation of tobermorite becomes difficult. If the value is over 0.9, glass fiber is eroded, so that a molding having a desired bending strength cannot be obtained. The compounding ratio of calcareous material to silicic material is set to preferably 0.7 to 0.85 at the $CaO/SiO_2$ molar ratio.

Regarding glass fiber, a chopped strand, which is obtained by cutting alkali proof glass fiber to have a suitable length, may be used, and its compounding ratio is 2 to 10% by weight. If the value is below 2% by weight, a desired reinforcing effect cannot be obtained. If the value is over 10% by weight, it is difficult to perform the molding process, and the reinforcing effect is not desirably increased. Pulp is also used together with glass fiber. The use of pulp improves dispersibility of glass fiber, and largely distributes improvement of processing and working of the molding in addition to reinforcing effect. A normal timber pulp is used after being disaggregated in a wet manner or a dry manner. Regarding the compounding ratio of the pulp, if the ratio is below 2% by weight, the reinforcing effect cannot be obtained. And, if the ratio is over 10% by weight, incombustibility of the molding is considerably reduced, and the reinforcing effect is little improved.

Regarding the compound of these materials, calcareous material and at least a part of amorphous silica are mixed with water, and used as slurry. The residual amorphous silica is added later similar to crystalline silica. Then, the adding ratio of the final amorphous silica preferably ranges from 0.2 to 0.8 at the amorphous silica/(crystalline silica+amorphous silica) ratio. If the value is low, the strength of the gel after being galled is weak, and the shape maintaining property is insufficient at the time of drawing the molding from a metal molding after the mixed materials are dehydrated and molded, and the handling of the molding becomes difficult. Moreover, if the value is high, pressure rises too much at the time of drawing the molding from the metal molding, and this is unfavorable in view of the manufacturing of the molding. Regarding the addition of calcareous material to amorphous material, the $CaO/SiO_2$ molar ratio is preferably 0.8 or more. If the ratio is below 0.8, gelation does not largely advance. In this case, it is of course that all calcareous material may be added thereto. However, addition of alkali proof glass fiber is unfavorable since glass fiber is eroded by free lime. Regarding a water/solid weight ratio, there is no special limitation, but the value preferably ranges from 3 to 10. At such a water ratio, gelation sufficiently advances, and swelling of gel does not increase too much. The important point when the materials are mixed is that the mixture is performed at temperature of 50° C. or less. If the mixture is performed at temperature of over 50° C., tobermorite, which is generated by the reaction in the autoclave, is considerably delayed, there is a possibility that the initial product cannot be obtained. The following reason can be considered. That is, a large amount of C—S—H, which is difficult to transfer to tobermorite, is generated if calcareous material and amorphous silica are mixed with each other at temperature of over 50° C. It is desirable that gelation be performed at 80° C. under normal pressure. Though gel time is influenced by reactivity of amorphous silica, gel time is normally 1 to 5 hours. It is preferable that there be intermittent mixing during the gel time.

Then, the remaining components are added to the above-obtained gel, and uniformly mixed. In this case, the remaing components are materials which were not added before gelation, and always includes the alkali proof glass fiber. Though water is further added thereto, the water/solid weight ratio is not particularly limited. For uniformly mixing fiber material, the above water ratio preferably ranges from 2.0 to 4.0. As a mixer to be used in this case, a diffusion type mixer such as an omni type mixer is preferably used. Then, mixing time within 5 minutes is sufficient for this case. Thereafter, the mixture is introduced into the metal molding, pressurized and dehydrated to be molded. Pressure to be applied in this case is suitably 3 to 30 kg/cm$^2$. If pressure is below 3 kg/cm$^2$, the shape maintaining property, which is after drawing the molding from the metal molding, is not good, and deformation is generated at the time of transferring. If pressure is over 30 kg/cm$^2$, layer-shape cracks are easily generated in the molding after the molding is pressurized and cured. A molding box can be arbitrarily used. However, a molding box having a thickness of 100 mm or less is preferably used since the uniformity of the reaction may be lost if the thickness is too large. The water/solid weight ratio of the obtained molding normally ranges from 1.0 to 3.0. In this case, the bulk density of the dried product is about 0.3 to 0.7 g/cc.

Then, the above molding is thermally reacted in the autoclave. The reaction is normally performed at temperature of 140° to 200° C. under saturated aqueous vapor. If the temperature is below 140° C., generation of tobermorite is considerably delayed, and if the temperature is over 200° C., xonotlite is partially generated. Therefore, either condition is unfavorable since the strength of the product is lowered.

In view of economy and stability of the quality of the product, the reaction is preferably performed at temperature of 160° to 195° C., and more preferably 170° to 190° C. The reaction time is set to the condition that Ti/Qi ratio is 0.1 to 1.0 as measured by powder X-ray-diffraction of the reacted molding. For example, in Examples 1 to 4 of the present invention, the reaction time is 3 to 8 hours in the case that the temperature is 180° C., 5 to 18 hours in the case that the temperature is 160° C., and 2 to 6 hours in the case that the temperature is 195° C. The present invention is, of course, not limited to the above temperature and time. After the cured molding is synthesized, the cured molding is dried, and a final product is obtained.

The following will explain Examples 1 to 4 and comparisons 1 to 3.

2.47 kg of quicklime powder was introduced into 8.65 kg of hot water having temperature of 90° C., and slacked, so that milk of lime was obtained. The obtained milk of lime was cooled at temperature of 32° C. Thereafter, 0.67 kg of diatomaceous earth fine powder (325 mesh whole-under) was added to the cooled milk of lime, and cold water was added thereto such that the water/solid weight ratio was set to 3.5, and was uniformly mixed. Thereafter, the mixture was heated in a warm bath, and gelled at temperature of 80° to 92° C. for two hours. After gelation, the gelled substance was cooled to 60° C. Then, 2.02 kg of silica powder (Toyane silica powder 250 mesh under), 0.67 kg of diatomaceous earth powder, and 0.37 kg of alkali proof glass fiber, and 0.37 kg of pulp were added thereto, and uniformly mixed for two minutes by the omni type mixer. The compositions of this mixture were as follows:

CaO/SiO$_2$ molar ratio: 0.83
amorphous silica/(crystalline silica+amorphous silica): 0.4
alkali proof glass fiber compounding ratio: 5%
pulp compounding ratio: 5%.

The mixture was introduced into the metal mold having an inner size of 610×1220 mm, and dehydrated at 12.0 kgf/cm$^2$ to obtain a molding. The thickness of the molding drawn from the metal mold was 18 mm. The molding was put in the autoclave and reacted for a predetermined time at temperature of 180° C. under saturated aqueous vapor, taken out of the autoclave, and dried in an absolute dry manner at 105° C. by a dryer. The bulk density of the dried product was 0.54 to 0.56 g/cc. However, the size and the thickness of the product were unchanged, that is, 610×1220 mm of the size and 18 mm of the thickness.

FIG. 1 shows an SEM photograph of Example 1. In the photograph, the entire surface of quartz is covered with C—S—H (Calcium Silicate hydrate) presenting white agglomeration, and it is shown that tobermorite is partially generated.

Table 1 shows the measuring result of the physical properties of the products obtained according to Examples 1 to 4 and comparisons 1 to 3.

In Table 1, the products shown in the comparisons are formed such that the Ti/Qi ratio outside the range of 0.1 to 1.0. The bending strength shown in Table 1 was measured in accordance with JIS-A-1408. The size of the object to be measured was 80 mm of the width×180 mm of the length×15 mm of the thickness, and the span length is set to 100 mm. Combustibility was measured in accordance with JIS-A-1321.

Regarding the abating property, an object having the size of 50 mm of length (X), 10 mm of width (Z) and 50 mm of thickness (Y) is cut from the portion close to substantially the center of the product. By use of a blade whose angle is 28°, the object whose depth of cut is 1 mm is abated at a cutting speed of 20 mm/min. In Table 1, a symbol o denotes a good abating property in which abatement is continuous, x denotes a bad abating property in which abatement is discontinuous, and Δ shows an intermediate abating property.

TABLE 1

|  |  | Autoclave Constant Pressure Time (hr) | SEM Observing Result | X-ray Diffraction Ti/Qi Peak Intensity Ratio (—) | Bulk Density ρ (g/cc) | Bending Strength σ (kgf/cm$^2$) | Ratio Intensity σ/ρ$^2$ (—) | Incombustibility | Abating Property |
| --- | --- | --- | --- | --- | --- | --- | --- | --- | --- |
| Embodiments | 1 | 3 | C-S-H Tobermorite Quartz can be Observed | 0.15 | 0.54 | 86 | 295 | 1st Rate of Flame Retardance | o |
|  | 2 | 4 | C-S-H Tobermorite can be Observed | 0.42 | 0.55 | 118 | 390 | 1st Rate of Flame Retardance | o |
|  | 3 | 5 | C-S-H Tobermorite can be Observed | 0.58 | 0.54 | 97 | 333 | 1st Rate of Flame Retardance | o |
|  | 4 | 8 | C-S-H Tobermorite can be Observed | 0.97 | 0.56 | 84 | 268 | 1st Rate of Flame Retardance | o |
| Comparisons | 5 | 2 | C-S-H Tobermorite can be | 0.08 | 0.56 | 52 | 116 | 1st Rate of Flame Retardance | x |

TABLE 1-continued

| | Autoclave Constant Pressure Time (hr) | SEM Observing Result | X-ray Diffraction Ti/Qi Peak Intensity Ratio (—) | Bulk Density $\rho$ (g/cc) | Bending Strength $\sigma$ (kgf/cm$^2$) | Ratio Intensity $\sigma/\rho^2$ (—) | Incombustibility | Abating Property |
|---|---|---|---|---|---|---|---|---|
| 6 | 10 | Observed Most of Matrix is Formed of Tobermorite | 1.12 | 0.54 | 63 | 216 | 1st Rate of Flame Retardance | Δ |
| 7 | 15 | Most of Matrix is Formed of Tobermorite | 1.45 | 0.55 | 46 | 152 | 1st Rate of Flame Retardance | x |

Figure 3:
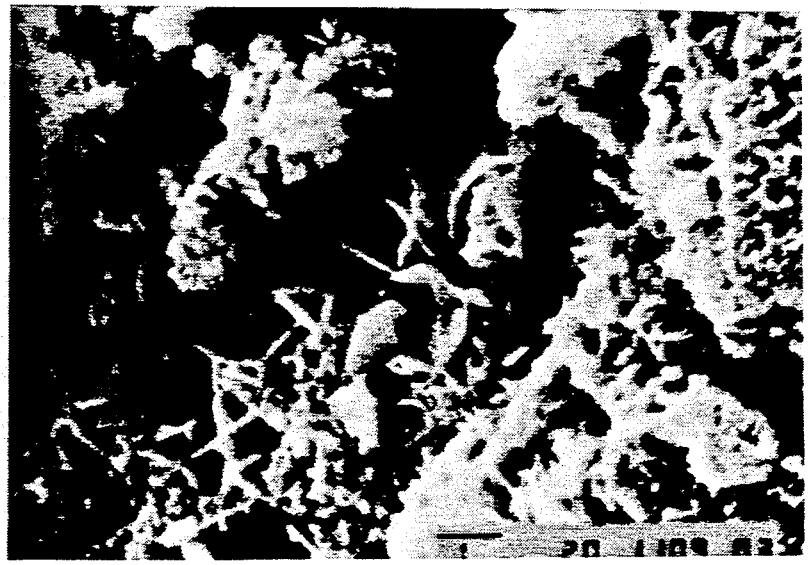
FIG. 3 is an SEM (Scanning Electron Microscope) photograph showing a crystal structure of a molding of calcium silicate of Example 5 of the present invention.

Example 5 will be explained as follows:

The product was obtained by the same method as Example 1 excepting that the reaction time in the autoclave was set to 5 hours 30 minutes. FIG. 3 shows an SEM photograph of the matrix of the molding of calcium silicate obtained in Example 5.

Figure 4:
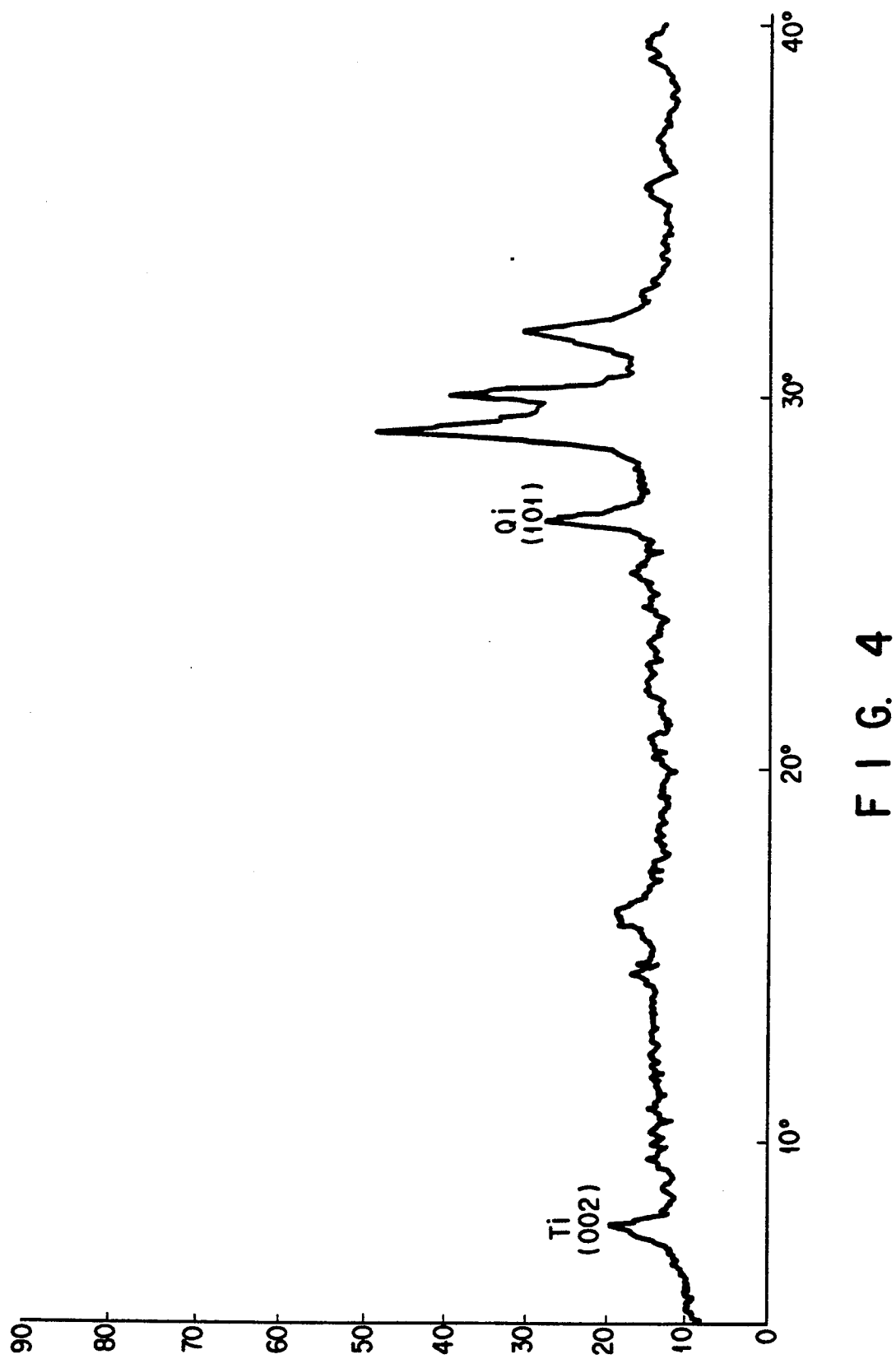
FIG. 4 is a powder X-ray diffraction chart of the molding of calcium silicate of Example 5.

It can be understood from FIG. 3 that tobermorite and C—S—H are mixed with each other. FIG. 4 is a chart of powder X-ray diffraction of the matrix of the molding of calcium silicate obtained in Example 5. As shown in FIG. 4, the peak of tobermorite and that of quartz are shown, and the intensity ratio of Ti/Qi was 0.64 wherein Ti=(002) surface of tobermorite ($2\theta=7.82°$) and Qi=(101) surface of quartz ($2\theta=26.65°$). FIGS. 5(A), 5(B) and FIGS. 6(A) and 6(B) are SEM photographs showing the broken surfaces of glass fiber and pulp when the molding of Example 5 is bent and broken.

Figure 6A:
Figure 6B:
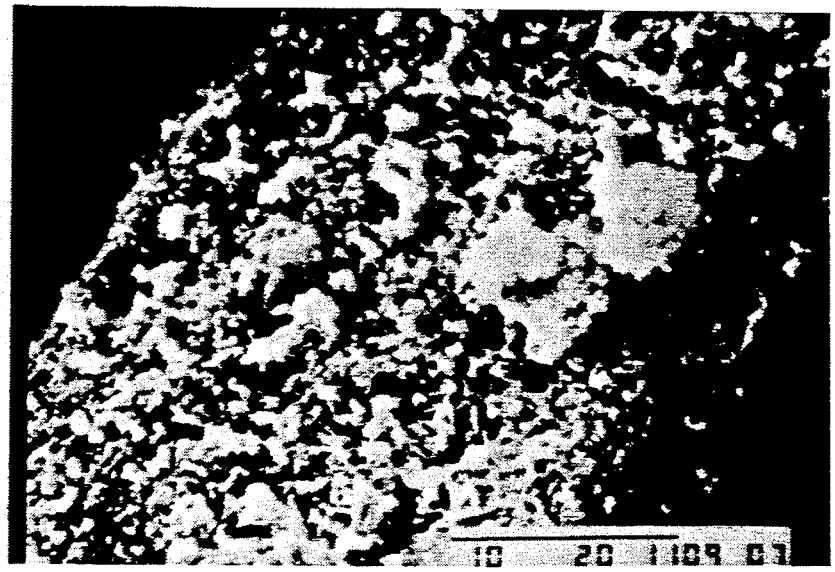

More specifically, FIG. 5(A) shows the state that the surface of glass fiber is covered with a base material of calcium silicate. FIG. 5(B) shows one enlarged glass fiber, which is shown in FIG. 5(A). It can be understood from FIG. 5(B) that C—S—H and tobermorite are strongly adhered to the surface of the glass fiber, thereby the base material and glass fiber are strongly adhered to each other. FIG. 6(A) shows the same type of broken surface as FIG. 5(A). Specifically, FIG. 6(A) shows the state that the surface of pulp is covered with a base material of calcium silicate. FIG. 6(B) shows an enlarged pulp, which is shown in FIG. 6(A). It can be understood from FIG. 6(B) that C—S—H and part of tobermorite are strongly adhered to the surface of the pulp, thereby the base material and pulp are strongly adhered to each other.

The following will explain Examples 6 to 8 and comparisons 4 to 6.

In Examples 6 to 8 and comparisons 4 to 6, the product was obtained by the same method as Example 4 excepting that the ratio of amorphous silica and the adding method were changed. The results are shown in Table 2.

TABLE 2

| | | Amorphous Silica/ (Crystalline Silica + Amorphous Silica) | Method of Adding Amorphous Silica | | Bulk Density $\rho$ (g/cc) | Bending Strength $\sigma$ (kgf/cm$^2$) | Ratio Strength $\sigma/\rho^2$ (—) | Note |
|---|---|---|---|---|---|---|---|---|
| | | | Before Gelation | After Gelation | | | | |
| Embodiment | 6 | 0.2 | 0.2 | 0 | 0.54 | 79.6 | 273 | |
| | 7 | 0.6 | 0.2 | 0.4 | 0.55 | 94.4 | 312 | |
| | 8 | 0.8 | 0.2 | 0.6 | 0.55 | 81.1 | 268 | |
| Comparisons | 4 | 0.1 | 0.1 | 0 | — | — | — | Shape Maintaining Property in Weak After Drawing Molding, Handling of Molding cannot be Performal |
| | 5 | 0.9 | 0.5 | 0.4 | 0.55 | 45.1 | 149 | A large Number of Layer-shape Cracks are Formed in Product |
| | 6 | 0.9 | 0.2 | 0.7 | 0.54 | 49.4 | 171 | |

Industrial Applicability

According to the present invention, the molding of calcium silicate having bulk density of 0.3 to 0.7 g/cc is light, and the strength ratio=(bending strength)/(bulk density)$^2$ is 260 or more. Also, working processes such as cutting, abating, polishing can be easily performed, no dust is generated, and holding force of bisscrew is large. Furthermore, since cracks, swelling, or pores are not generated on the surface or the inside of the product, and the molding of the present invention has good incombustibility, heat resistance, and stability of size, the molding of the present invention can be widely used in a wall material, a partition material, a floor material, and a heat insulating material.

We claim:

1. A molding of calcium silicate having high strength comprising calcium silicate hydrate, quartz, tobermorite and a reinforcing material made of glass fiber and pulp, wherein said molding contains 2-10 wt % of said glass fiber and 2-10 wt % of said pulp, a Ti/Qi ratio obtained by powder-X-ray diffraction is 0.1-1.0, wherein Ti represents the intensity of the X-ray diffraction of a (002) face of tobermorite crystal, and Qi represents the intensity of the X-ray diffraction of a (101) face of quartz crystal, and said molding has an absolute bulk density is 0.3–0.7 g/cc.

2. A method of manufacturing a molding of calcium silicate containing tobermorite and quartz and having high strength, from a calcareous material, a silicic material, and a fiber material, as raw materials, wherein the silicic material is formed of crystalline silica and amorphous silica mixed at a weight ratio of the amorphous silica to the total of the crystalline silica and the amorphous silica, of 0.2–0.8, the fiber material consists of alkali-proof glass fiber and pulp, the calcareous material and the silicic material are added such that the $CaO/SiO_2$ molar ratio is 0.6–0.9, and the fiber material is added such that the amount of each of the alkali-proof glass fiber and the pulp is 2–10 wt %, comprising the steps of:

(a) mixing all of the calcareous material, and part or all of the non-crystalline silica, of the raw materials, with water to form a slurry having a temperature of 50° C.;

(b) making said slurry into a gel by heating said slurry at a temperature of 80° C. or higher at atmospheric pressure;

(c) uniformly mixing said gel obtained in the above step (b) with the rest of said raw material;

(d) molding a mixture obtained in the above step (c) by dehydration at a pressure of 3–30 $kg/cm^2$ to form a molding; and (f) pressurizing and heating the molding obtained in the above step (d) in an autoclave under a saturation vapor pressure, at a temperature of 140°–200° C., for 2–18 hours until the Ti/Qi ratio measured by powder-X-ray-diffraction is 0.1–1.0, wherein Ti represents an intensity of the X-ray diffraction of a (002) face of tobermorite crystal, and Qi represents an intensity of the X-ray diffraction of a (101) face of quartz crystal, respectively.

* * * * *